United States Patent
Koyanagi et al.

(10) Patent No.: US 7,173,965 B2
(45) Date of Patent: Feb. 6, 2007

(54) EQUALIZING A SIGNAL FOR TRANSMISSION

(75) Inventors: Yoichi Koyanagi, Cupertino, CA (US); Yasuo Hidaka, Cupertino, CA (US); Weixin Gai, San Jose, CA (US); Hirotaka Tamura, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 746 days.

(21) Appl. No.: 10/357,691

(22) Filed: Feb. 3, 2003

(65) Prior Publication Data

US 2004/0151239 A1 Aug. 5, 2004

(51) Int. Cl.
*H03K 5/159* (2006.01)
*H04B 3/04* (2006.01)
*H04B 3/14* (2006.01)
*H01P 9/00* (2006.01)

(52) U.S. Cl. ............... 375/229; 375/232; 333/17.1; 333/18; 333/28 R

(58) Field of Classification Search ........... 375/229, 375/230, 232
See application file for complete search history.

(56) References Cited

U.S. PATENT DOCUMENTS

| | | | | |
|---|---|---|---|---|
| 3,864,632 A * | 2/1975 | Chang | ............ | 375/230 |
| 5,841,810 A * | 11/1998 | Wong et al. | ............ | 375/232 |
| 6,185,251 B1 * | 2/2001 | Fertner | ............ | 375/231 |
| 6,263,018 B1 * | 7/2001 | Lee | ............ | 375/233 |
| 7,023,912 B2 * | 4/2006 | Orlik et al. | ............ | 375/232 |
| 2005/0008070 A1 * | 1/2005 | Wang et al. | ............ | 375/232 |

* cited by examiner

*Primary Examiner*—Kevin Kim
*Assistant Examiner*—Linda Wong
(74) *Attorney, Agent, or Firm*—Baker Botts L.L.P.

(57) ABSTRACT

Equalizing a signal includes receiving a data sequence signal having an amplitude. An adjustment of the data sequence signal operable to equalize the data sequence signal is determined. A control signal operable to adjust the amplitude of the data sequence signal in accordance with the adjustment is generated, where the control signal has an analog form. The amplitude of the data sequence signal is adjusted using the control signal in order to equalize the data sequence signal.

20 Claims, 4 Drawing Sheets

US 7,173,965 B2

EQUALIZING A SIGNAL FOR TRANSMISSION

TECHNICAL FIELD OF THE INVENTION

This invention relates generally to the field of data communication and more specifically to equalizing a signal for transmission.

BACKGROUND OF THE INVENTION

A signal transmitted from a transmitter to a receiver typically experiences distortion. To compensate for expected distortion, the transmitter may perform a pre-emphasis on a signal by adjusting the amplitude of the signal. Known techniques of equalizing a signal, however, are generally slow and inefficient. Consequently, known techniques for equalizing a signal may be unsatisfactory in certain situations.

SUMMARY OF THE INVENTION

In accordance with the present invention, disadvantages and problems associated with previous techniques for equalizing a signal for transmission may be reduced or eliminated.

According to one embodiment of the present invention, equalizing a signal includes receiving a data sequence signal having an amplitude. An adjustment of the data sequence signal operable to equalize the data sequence signal is determined. A control signal operable to adjust the amplitude of the data sequence signal in accordance with the adjustment is generated, where the control signal has an analog form. The amplitude of the data sequence signal is adjusted using the control signal in order to equalize the data sequence signal.

Certain embodiments of the invention may provide one or more technical advantages. A technical advantage of one embodiment may be that an equalizing filter utilizes an analog signal to adjust a signal to compensate for distortion. The analog signal may provide a faster and more efficient manner to adjust the signal.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 7 of the drawings, like numerals being used for like and corresponding parts of the various drawings.

Figure 1:
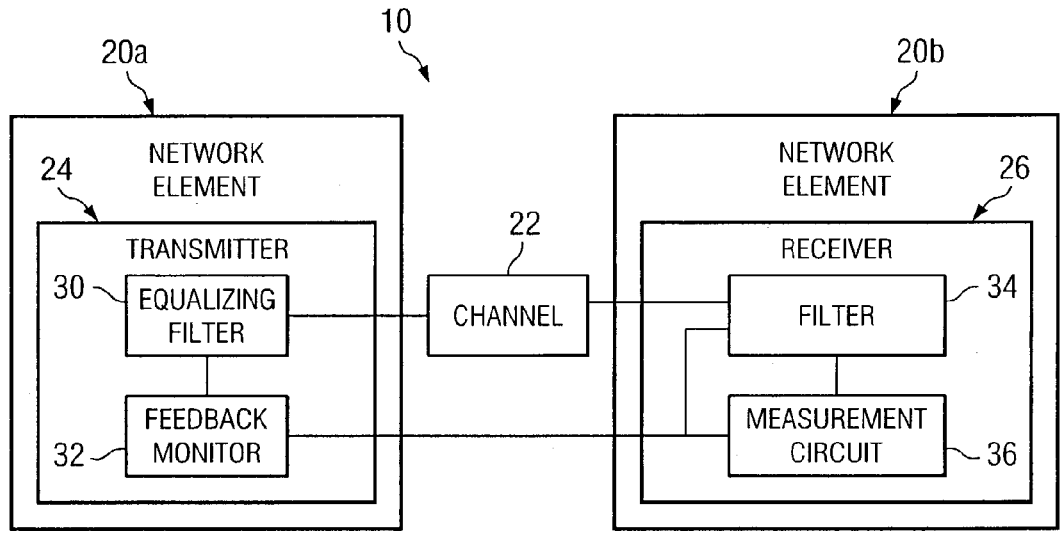
FIG. 1 is a block diagram illustrating one embodiment of a network having a transmitter that adjusts a transmitted signal to compensate for expected distortion.

FIG. 1 is a block diagram illustrating one embodiment of a network 10 having a transmitter that adjusts a transmitted signal to compensate for expected distortion. The transmitter uses feedback from a receiver to predict the distortion that will occur as the signal propagates through a channel to the receiver. To compensate for the expected distortion, the transmitter performs a pre-emphasis on the signal by adjusting the amplitude of the signal. The transmitter includes an equalizing filter that utilizes an analog signal to control the amplitude adjustment.

According to the illustrated embodiment, network 10 includes network elements 20a–b and a channel 22 coupled as shown in FIG. 1. A network element 20 may comprise an element that transmits and receives data such as a server system, a storage system, a network system, a routing system, or any combination of the proceeding. A server system may include one or more central processing units (CPUs) and one or more memory units. A storage system may include one or more channel adapters (CAs), one or more disk adapters (DAs), and one or more CPU modules (CMs). A routing system may couple network 10 to one or more other networks, which include one or more local area networks (LANs), wide area networks (WANs), or other networks.

Channel 22 may comprise a cable having a length in the range of ten to one hundred meters such as approximately twenty to forty meters. The speed of a signal traveling through channel 22 may be in the range of multi-gigabits per second such as approximately three gigabits per second. As an example, channel 22 may operate according to the 10 Gigabit Attachment Unit Interface (XAUI) standards, which require a fixed frequency of 3.125 gigabits and is used for 10 Gigabit Ethernet.

Signals traveling at high speeds are susceptible to distortion resulting from an impulse response of channel 22. A received signal may suffer from frequency dependent distortion due to the skin effect and dielectric loss. Frequency dependent distortion may result in interference such as inter-symbol interference (ISI). Multi-gigabit rate communication typically requires a high degree equalization over approximately twenty to forty dB to overcome inter-symbol interference.

Network element 20a includes a transmitter 24, and network element 20b includes a receiver 26. Transmitter 24 transmits a signal through channel 22 to receiver 26. Transmitter 24 includes an equalizing filter 30 and a feedback monitor 32. Equalizing filter 30 adjusts a transmitted signal to compensate for expected distortion occurring during transmission. The adjustment is determined according to feedback information received by feedback monitor 32 from receiver 26. Equalizing filter 30 utilizes an analog signal to control the amplitude, which may allow for more precise adjustment of the signal. Known techniques use multiple transistors to control the amplitude. Transistors, however, typically cannot provide fine resolution control. Known techniques may use digital signal processors (DSPs) to compensate for the distortion. Digital signal processors, however, are typically too slow and inefficient for multi-gigabit per second transmission.

Receiver 26 includes a filter 34 and a measurement circuit 36. Measurement circuit 36 estimates an error associated with the received signal. The error comprises an amplitude error, which may result from the distortion associated with transmission through channel 22. The error may be used to adjust equalizing filter 30, filter 34, or both to compensate for the error.

Elements may be modified, added, or omitted without departing from the scope of the invention. For example, filter 34 may be omitted, allowing for equalizing filter 30 to perform the equalization process. Additionally, functions may be performed using software, hardware, other logic, or any suitable combination of the preceding. Examples of equalizing filters 30 are described with reference to FIGS. 2, 3, and 4. An example of method for equalizing a received signal is described with reference to FIG. 4. As used in this document, "each" refers to each member of a set or each member of a subset of a set.

Figure 2:
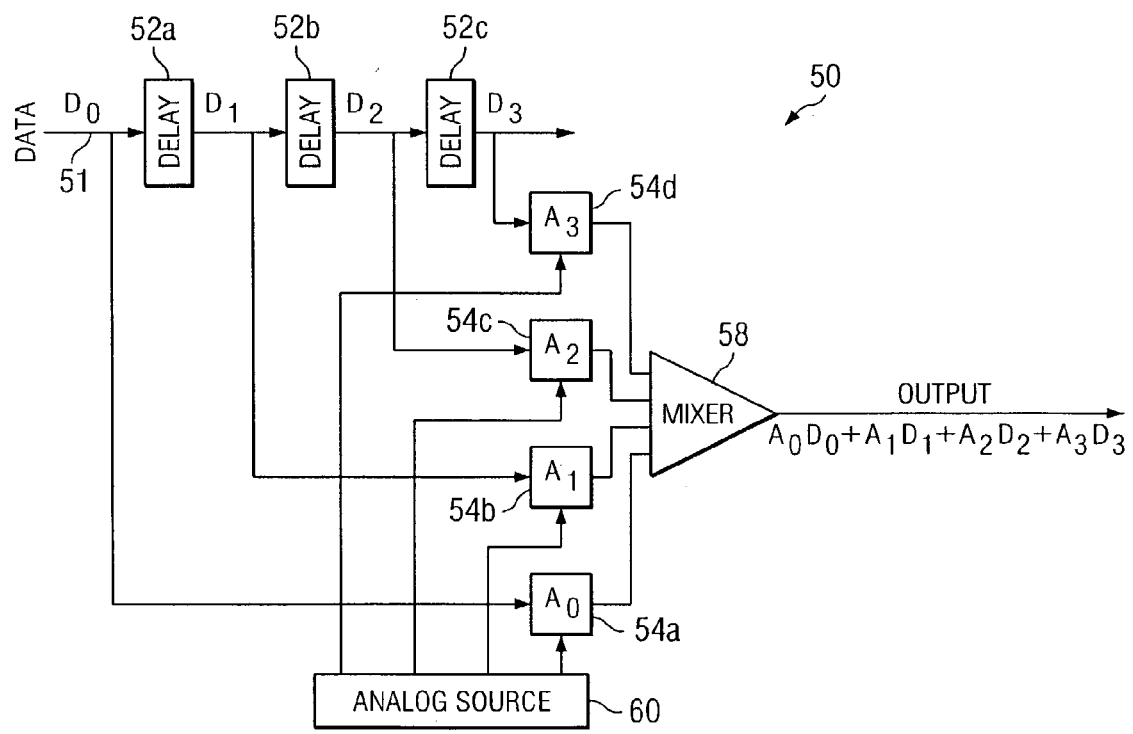
FIG. 2 is a block diagram illustrating one embodiment of a system for equalizing a signal for transmission.

FIG. 2 is a block diagram illustrating one embodiment of a system 50 for equalizing a signal for transmission. System 50 adjusts the amplitude of a data sequence signal in order to compensate for expected distortion that the signal may experience during transmission through channel 22. System 50 includes an analog source that provides a control signal that adjusts the amplitude of the signal. The analog control signal may provide for more precise adjustment of the amplitude.

System 50 includes an input 51, one or more delays 52a–c, one or more filter coefficient circuits 54a–d, a mixer 58, and an analog source 60 coupled as shown in FIG. 2. System 50 receives a data sequence signal comprising a data sequence. Delay circuits 52a–c perform a delay operation on the signal to generate a signal delayed by, for example, a one bit time delay. In the illustrated example, delay circuit 52a performs a delay on signal $D_0$ to generate signal $D_1$. The received signal is transformed into segments $D_i$, where each segment comprises one or more bits of the received signal. In the illustrated example, the received signal is transformed into segments $D_0$, $D_1$, $D_2$, and $D_3$, where each segment comprises one bit.

Filter coefficient circuits 54a–d adjust the amplitude of signals according to filter coefficients. Each filter coefficient circuit 54 adjusts the amplitude of a corresponding signal. For example, filter coefficient circuit 54a adjusts signal $D_0$ according to filter coefficient $A_0$, and filter coefficient circuit 54b adjusts the amplitude of signal $D_1$ according to filter coefficient $A_1$. In the illustrated example, segments $D_0$, $D_1$, $D_2$, and $D_3$ are filtered according to corresponding filter coefficients $A_0$, $A_1$, $A_2$, and $A_3$. Each combination of a signal $D_i$ adjusted by a filter coefficient circuit 54 forms a tap. In the illustrated example, system 50 includes four taps. System 50, however, may include any suitable number of taps.

Analog source 60 generates a control signal having an analog form that controls the amplitude adjustment performed by filter coefficient circuits 54a–d. Analog source 60 may generate a voltage control signal that adjusts the voltage of the signals, or may generate a current control signal that adjusts the current of the signals. Since the length of channel 22 generally remains constant, the adjustment for the distortion also typically remains unchanged. Accordingly, filter coefficients also may remain relatively constant.

Known techniques for adjusting the signal amplitude involve using multiple transistors to control the filter coefficients. Multiple transistors, however, are typically slow. Additionally, more transistors are needed to improve the resolution with which the filter coefficients may be controlled.

Mixer 58 sums the adjusted signals to generate an output. In the illustrated example, the output comprises $A_0D_0 + A_1D_1 + A_2D_2 + A_3D_3$. The output is transmitted through channel 22 to receiver 26. As a signal travels through channel 22, it may experience distortion. The equalization performed by equalizing filter 30, however, may adjust the signal such that the signal received at receiver 26 is usable by receiver 26.

Figure 3:
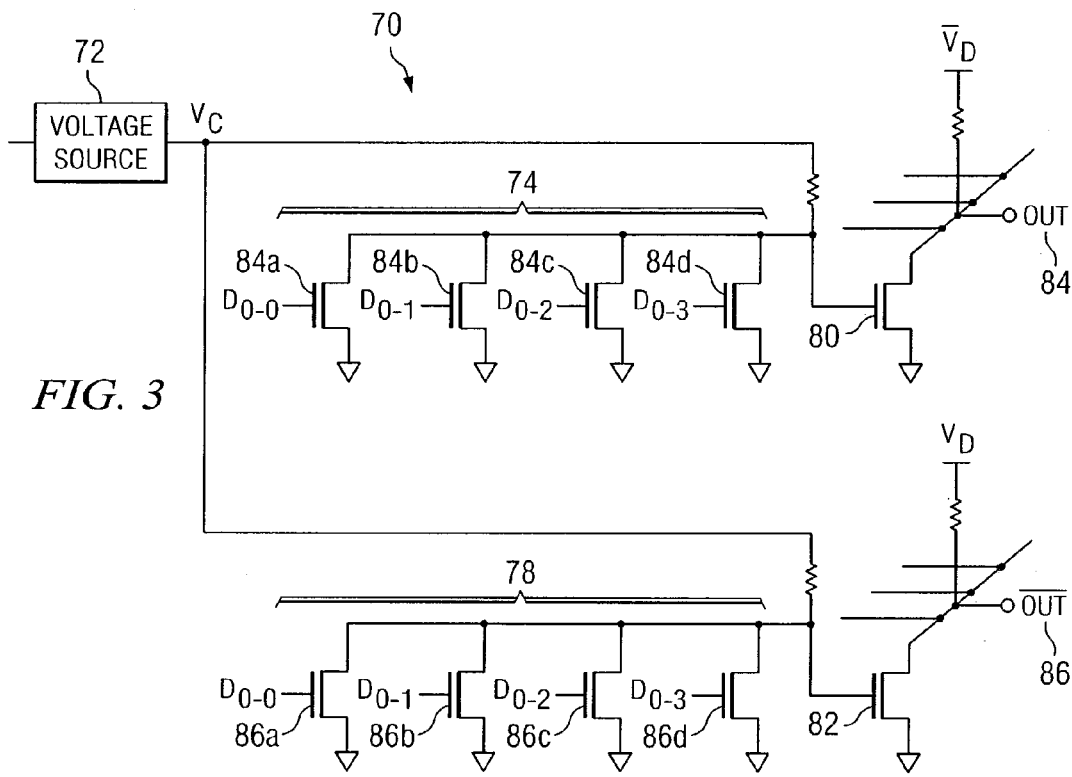
FIG. 3 is a block diagram illustrating one embodiment of an equalizing filter that adjusts the voltage of a signal for transmission.

FIG. 3 is a diagram illustrating one embodiment of an equalizing filter 70 that adjusts the voltage of a signal for transmission. Equalizing filter 70 includes a voltage source 72, multiplexers 74 and 78, and transistors 80 and 82 coupled as shown in FIG. 3. Voltage source 72 generates a control signal $V_c$ that is used to adjust the voltage of signals $D_0$. Voltage source 72 may comprise, for example, a digitally controlled voltage source such as a digital-to-analog converter.

Voltage source 72 may generate the control signal $V_c$ in response to instructions received from feedback monitor 32. The instructions typically include coefficient parameters used to adjust the voltage of the control signal $V_c$, which in turn controls the amplitude of the signal. The control signal $V_c$ may operate in a range of approximately zero to one volt. Receiver 26, transmitter 24, or both may generate the instructions in response to a determination of distortion at receiver 26.

Multiplexer 74 multiplexes signals $D_{0\text{-}0}$, $D_{0\text{-}1}$, $D_{0\text{-}2}$, and $D_{0\text{-}3}$ to generate a data stream. Multiplexer 74 includes transistors 84a–d. Transistors 84a–d switch on and off with respect to the characters of signal $D_i$. For example, a transistor 84 may switch on if the data segment includes a character having a one, and may switch off if the data segment includes a character having a zero.

Multiplexer 78 multiplexes the inverse of the signals $D_{0\text{-}0}$, $D_{0\text{-}1}$, $D_{0\text{-}2}$, and $D_{0\text{-}3}$ to generate an inverse data stream. Multiplexer 78 includes transistors 86a–d that operate in a manner substantially similar to that of transistors 84a–d, but perform their functions on the inverse of the signals to yield an inverse output. That is, transistors 86a–d switch on and off with respect to the characters of the inverse of signal $D_i$.

Multiplexers 74 and 78 may be used to reduce the circuit operation frequency of equalizing filter 30. An m-to-1 multiplexer, where m is any suitable integer, may be used to decrease the circuit operation frequency by 1/m. For example, if a line speed of 3.2 gigahertz is used in combination with a 4-to-1 multiplexer, then equalizing filter 30 may only need to operate at a frequency of 800 megahertz.

Transistor 80 switches on and off in response to the control signal $V_c$ and the data sequence signal. If the gate voltage is zero, then transistor 80 is switched off. If the gate voltage reaches the control voltage $V_c$, then transistor 80 is switched on. If transistor 80 is switched off, then an output voltage 84 is a high voltage $V_d$. Conversely, if transistor 80 is switched on, then output voltage 84 is a low voltage.

The high voltage is typically constant, but the low voltage is determined by the control voltage $V_c$. Accordingly, changing control voltage $V_c$ changes the low voltage. Since the low voltage is adjustable, the swing between the low voltage and the high voltage is also adjustable. Accordingly, voltage source 72 may adjust the swing between high voltage and low voltage by adjusting control voltage $V_c$. Transistor 82 operates in a manner similar to that of transistor 80, but performs its functions on the inverse of the signal to yield an inverse output voltage 86. Output voltage 84 and inverse output voltage 86 are used to form a differential output.

Figure 4:
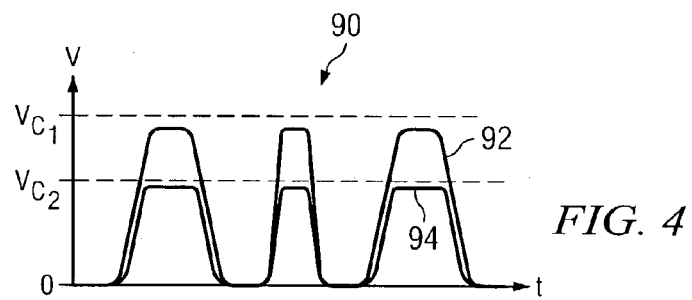
FIGS. 4 and 5 are graphs illustrating how a control voltage may be used to adjust a swing between a high voltage and a low voltage.
Figure 5:
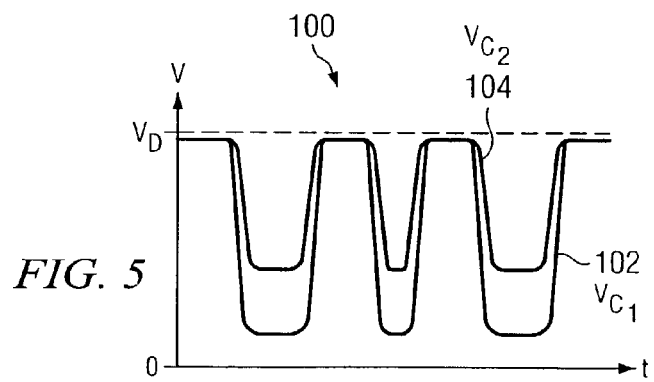

FIGS. 4 and 5 are graphs 90 and 100 illustrating how control voltage $V_c$ may be used to adjust the swing between a high voltage and a low voltage. FIG. 4 includes a graph 90 illustrating an example of voltages received at transistor 80 with respect to time t. A graph 92 represents the voltage received at transistor 80 if the control voltage is $V_{c1}$. A graph 94 represents the voltage received at transistor 80 if the control voltage is $V_{c2}$.

FIG. 5 is a diagram 100 illustrating examples of output voltages of transistor 80 associated with different control voltages $V_c$ with respect to time t. A graph 102 represents the voltages received if the control voltage is $V_{c1}$, and a graph 104 represents the output voltage if the control voltage is $V_{c2}$. Graphs 102 and 104 illustrate that the output voltage may be adjusted by changing control voltage $V_c$.

Figure 6:
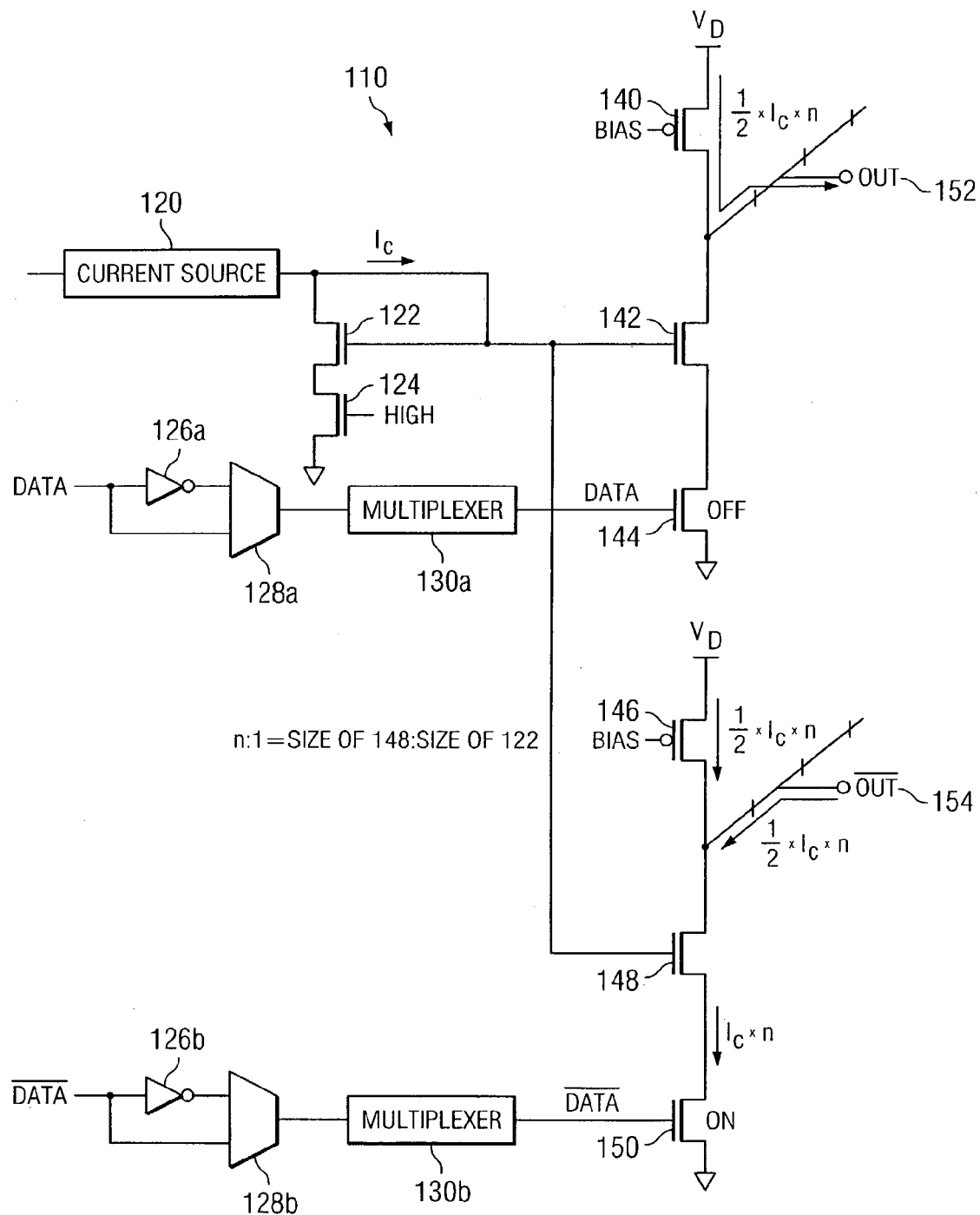
FIG. 6 is a block diagram illustrating one embodiment of an equalizing filter that adjusts the current of a signal for transmission.

FIG. 6 is a diagram illustrating one embodiment of an equalizing filter 110 that adjusts the current of a signal for transmission. Equalizing filter 110 includes a current source 120, transistors 122, 124, 148, and 150, inverters 126*a–b*, and multiplexers 128*a–b* and 130*a–b*. Current source 120 generates a control signal having an analog form that is used to adjust the amplitude of a data sequence signal. Current source 120 may comprise a digitally controlled current source such as a digital-to-analog converter. Transistors 122, 124, 148, and 150 form a current mirror. For example, if current source 120 generates a control current $I_c$ and transistor 150 is turned on, the current through transistor 148 is $(I_c*n)$, where the size ratio of transistors 122 and 148 is 1:n. Transistors 122, 124, 142, and 144 operate in a similar manner.

Inverters 126*a–b* and multiplexers 128*a–b* operate to send only positive values of the data sequence and the inverse data sequence to multiplexers 130*a–b*. Inverters 126*a–b* invert the incoming data sequence. Multiplexers 128*a–b* select positive values of the data sequence or the inverse data sequence, respectively. Multiplexers 130*a–b* multiplex data segments into a data stream. An m-to-1 multiplexer, where n is any suitable integer, that multiplexes m data segments into one data stream may be used to decrease the circuit operation frequency by a factor of 1/m.

Equalizing filter 110 also includes current sources 140 and 146 and out nodes 152 and 154 coupled as shown in FIG. 6. Current sources 140 and 146 provide a constant current. The amount of current is determined by the BIAS, which is adjusted according to the sum of the current sources 120 for the taps. According to the illustrated example, current sources 140 and 146 operate as a $(½*I_c*n)$ current source. Out nodes 152 and 154 transmit currents to and from a transmission channel.

In operation, if transistor 144 is turned off in response to data sequence $D_i$ and if transistor 150 is turned on in response to the inverse of data sequence $D_i$, a current $(½*I_c*n)$ goes out through out node 152 to the transmission channel, and a return current $(½*I_c*n)$ from the transmission channel returns through inverse out node 154. The current $(½*I_c*n)$ from current source 146 and the current $(½*I_c*n)$ from inverse out node 154 yields a current $(I_c*n)$ that flows through transistor 148. Additionally, if transistor 144 is turned on and if transistor 150 is turned off, the currents through out node 152 and inverse out node 154 are reversed. Accordingly, the current waveform follows data sequence $D_i$, and the amplitude of the current is determined by current source 120.

Figure 7:
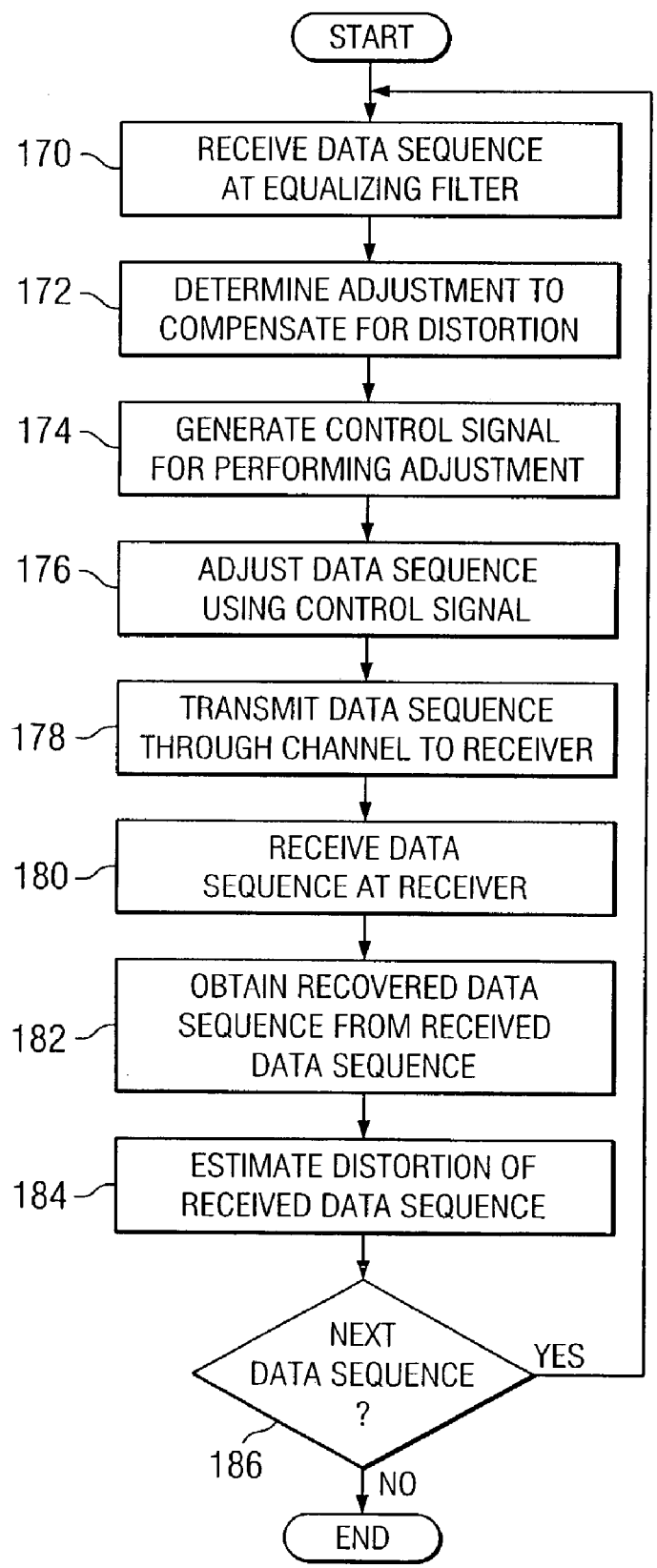
FIG. 7 is a flowchart illustrating one embodiment of a method for equalizing a signal for transmission.

FIG. 7 is a flowchart illustrating one embodiment of a method for equalizing a signal for transmission. The method begins at step 170, where equalizing filter 30 at transmitter 24 receives a data sequence signal. Equalizing filter 30 determines an adjustment to compensate for expected distortion at step 172. The determination may be made in response to instructions received from feedback monitor 32. The instructions describe how the data sequence signal may be adjusted in order to compensate for expected distortion.

Equalizing filter 30 generates a control signal for performing the adjustment at step 174. The control signal may have an analog form and may adjust either a current or voltage of the data sequence signal to be transmitted. The data sequence signal is adjusted using the control signal at step 176, and the data sequence signal is transmitted through channel 22 to receiver 26 at step 178.

Receiver 26 receives the data sequence signal at step 180. Receiver 26 processes the data sequence signal in order to obtain a recovered data sequence from the received data sequence signal at step 182. Measurement circuit 36 estimates the distortion of the received data sequence at step 184. The estimated distortion may be used to generate instructions for adjusting the signal to compensate for distortion. If there is a next data sequence at step 186, the method returns to step 170, where equalizing filter 30 receives the next data sequence. If there is no next data sequence at step 186, the method terminates.

Steps may be modified, added, or omitted without departing from the scope of the invention. Additionally, steps may be performed in any suitable order without departing from the scope of the invention.

Although an embodiment of the invention and its advantages are described in detail, a person skilled in the art could make various alterations, additions, and omissions without departing from the spirit and scope of the present invention as defined by the appended claims.

What is claimed is:

1. A method for equalizing a signal, comprising:
receiving a data sequence signal, the data sequence signal having an amplitude;
determining an adjustment of the data sequence signal operable to equalize the data sequence signal;
generating a control signal operable to adjust the amplitude of the data sequence signal in accordance with the adjustment, the control signal having an analog form; and
adjusting the amplitude of the data sequence signal using the control signal in order to equalize the data sequence signal, the adjusting the amplitude of the data sequence signal using the control signal comprising:
outputting a low output signal in response to receiving a first character of the data sequence signal, the first character comprising a zero, the low output signal having a low amplitude determined according to the control signal; and
outputting a high output signal in response to receiving a second character of the data sequence signal, the second character comprising a one, the high output signal having a high amplitude determined according to the control signal.

2. The method of claim 1, wherein generating a control signal operable to adjust the amplitude of the data sequence signal in accordance with the adjustment comprises generating the control signal at a digital-to-analog converter.

3. The method of claim 1, further comprising:
transmitting the equalized data sequence signal;
receiving the equalized data sequence signal;
determining an error associated with the equalized data sequence signal; and
determining a next adjustment of a next data sequence signal in response to the error, the next adjustment operable to equalize the next data sequence signal.

4. The method of claim 1, wherein:
the amplitude of the data sequence signal comprises an electrical current amplitude of the data sequence signal; and
the control signal comprises a control current operable to adjust the electrical current amplitude of the data sequence signal.

5. The method of claim 1, wherein:
the amplitude of the data sequence signal comprises a voltage amplitude of the data sequence signal; and
the control signal comprises a control voltage operable to adjust the voltage amplitude of the data sequence signal.

6. A method for equalizing a signal, comprising:
receiving a data sequence signal, the data sequence signal having an amplitude;
determining an adjustment of the data sequence signal operable to equalize the data sequence signal;
generating a control signal operable to adjust the amplitude of the data sequence signal in accordance with the adjustment, the control signal having an analog form; and
adjusting the amplitude of the data sequence signal using the control signal in order to equalize the data sequence signal, the adjusting the amplitude of the data sequence signal using the control signal comprising:
  outputting a low output signal in response to receiving a first character of the data sequence signal, the first character comprising a zero, the low output signal having a low amplitude determined according to the control signal;
  outputting a high output signal in response to receiving a second character of the data sequence signal, the second character comprising a one, the high output signal having a high amplitude determined according to the control signal;
  outputting a high inverse output signal in response to receiving a third character of the data sequence signal, the first character comprising a zero, the high inverse output signal having a high amplitude determined according to the control signal; and
  outputting a low inverse output signal in response to receiving a fourth character of the data sequence signal, the second character comprising a one, the low inverse output signal having a low amplitude determined according to the control signal.

7. A system for equalizing a signal, comprising:
an input operable to receive a data sequence signal, the data sequence signal having an amplitude;
an analog source operable to:
  determine an adjustment of the data sequence signal operable to equalize the data sequence signal; and
  generate a control signal operable to adjust the amplitude of the data sequence signal in accordance with the adjustment, the control signal having an analog form; and
a plurality of filter coefficient circuits coupled to the input and the analog source, each filter coefficient circuit operable to adjust the amplitude of the data sequence signal using the control signal in order to equalize the data sequence signal by:
  outputting a low output signal in response to receiving a first character of the data sequence signal, the first character comprising a zero, the low output signal having a low amplitude determined according to the control signal; and
  outputting a high output signal in response to receiving a second character of the data sequence signal, the second character comprising a one, the high output signal having a high amplitude determined according to the control signal.

8. The system of claim 7, wherein the analog source comprises a digital-to-analog converter.

9. The system of claim 7, further comprising:
a transmitter operable to transmit the equalized data sequence signal; and
a receiver operable to:
  receive the equalized data sequence signal;
  determine an error associated with the equalized data sequence signal; and
  determine a next adjustment of a next data sequence signal in response to the error, the next adjustment operable to equalize the next data sequence signal.

10. The system of claim 7, wherein:
the amplitude of the data sequence signal comprises an electrical current amplitude of the data sequence signal; and
the control signal comprises a control current operable to adjust the electrical current amplitude of the data sequence signal.

11. The system of claim 7, wherein:
the amplitude of the data sequence signal comprises a voltage amplitude of the data sequence signal; and
the control signal comprises a control voltage operable to adjust the voltage amplitude of the data sequence signal.

12. A system for equalizing a signal, comprising:
an input operable to receive a data sequence signal, the data sequence signal having an amplitude;
an analog source operable to:
  determine an adjustment of the data sequence signal operable to equalize the data sequence signal; and
  generate a control signal operable to adjust the amplitude of the data sequence signal in accordance with the adjustment, the control signal having an analog form; and
a plurality of filter coefficient circuits coupled to the input and the analog source, each filter coefficient circuit operable to adjust the amplitude of the data sequence signal using the control signal in order to equalize the data sequence signal by:
  outputting a low output signal in response to receiving a first character of the data sequence signal, the first character comprising a zero, the low output signal having a low amplitude determined according to the control signal;
  outputting a high output signal in response to receiving a second character of the data sequence signal, the second character comprising a one, the high output signal having a high amplitude determined according to the control signal;
outputting a high inverse output signal in response to receiving a third character of the data sequence signal, the first character comprising a zero, the high inverse output signal having a high amplitude determined according to the control signal; and
outputting a low inverse output signal in response to receiving a fourth character of the data sequence signal, the second character comprising a one, the low inverse output signal having a low amplitude determined according to the control signal.

13. Logic for equalizing a signal, the logic embodied in a medium and when executed by a computer operable to:
receive a data sequence signal, the data sequence signal having an amplitude;
determine an adjustment of the data sequence signal operable to equalize the data sequence signal;

generate a control signal operable to adjust the amplitude of the data sequence signal in accordance with the adjustment, the control signal having an analog form; and adjust the amplitude of the data sequence signal using the control signal in order to equalize the data sequence signal by:

outputting a low output signal in response to receiving a first character of the data sequence signal, the first character comprising a zero, the low output signal having a low amplitude determined according to the control signal; and outputting a high output signal in response to receiving a second character of the data sequence signal, the second character comprising a one, the high output signal having a high amplitude determined according to the control signal.

14. The logic of claim 13, operable to generate a control signal operable to adjust the amplitude of the data sequence signal in accordance with the adjustment by generating the control signal at a digital-to-analog converter.

15. The logic of claim 13, further operable to:
transmit the equalized data sequence signal;
receive the equalized data sequence signal;
determine an error associated with the equalized data sequence signal; and
determine a next adjustment of a next data sequence signal in response to the error, the next adjustment operable to equalize the next data sequence signal.

16. The logic of claim 13, wherein:
the amplitude of the data sequence signal comprises an electrical current amplitude of the data sequence signal; and
the control signal comprises a control current operable to adjust the electrical current amplitude of the data sequence signal.

17. The logic claim 13, wherein:
the amplitude of the data sequence signal comprises a voltage amplitude of the data sequence signal; and
the control signal comprises a control voltage operable to adjust the voltage amplitude of the data sequence signal.

18. Logic for equalizing a signal, the logic embodied in a medium and when executed by a computer operable to:
receive a data sequence signal, the data sequence signal having an amplitude;
determine an adjustment of the data sequence signal operable to equalize the data sequence signal;
generate a control signal operable to adjust the amplitude of the data sequence signal in accordance with the adjustment, the control signal having an analog form; and
adjust the amplitude of the data sequence signal using the control signal in order to equalize the data sequence signal by:
outputting a low output signal in response to receiving a first character of the data sequence signal, the first character comprising a zero, the low output signal having a low amplitude determined according to the control signal;
outputting a high output signal in response to receiving a second character of the data sequence signal, the second character comprising a one, the high output signal having a high amplitude determined according to the control signal;
outputting a high inverse output signal in response to receiving a third character of the data sequence signal, the first character comprising a zero, the high inverse output signal having a high amplitude determined according to the control signal; and
outputting a low inverse output signal in response to receiving a fourth character of the data sequence signal, the second character comprising a one, the low inverse output signal having a low amplitude determined according to the control signal.

19. A system for equalizing a signal, comprising:
means for receiving a data sequence signal, the data sequence signal having an amplitude;
means for determining an adjustment of the data sequence signal operable to equalize the data sequence signal;
means for generating a control signal operable to adjust the amplitude of the data sequence signal in accordance with the adjustment, the control signal having an analog form; and
means for adjusting the amplitude of the data sequence signal using the control signal in order to equalize the data sequence signal by:
outputting a low output signal in response to receiving a first character of the data sequence signal, the first character comprising a zero, the low output signal having a low amplitude determined according to the control signal; and
outputting a high output signal in response to receiving a second character of the data sequence signal, the second character comprising a one, the high output signal having a high amplitude determined according to the control signal.

20. A method for equalizing a signal, comprising:
receiving a data sequence signal, the data sequence signal having an amplitude comprising a voltage amplitude and determining an adjustment of the data sequence signal operable to equalize the data sequence signal;
generating at a digital-to-analog converter a control signal comprising a control voltage operable to adjust the voltage amplitude of the data sequence signal in accordance with the adjustment, the control signal having an analog form;
adjusting the amplitude of the data sequence signal using the control signal in order to equalize the data sequence signal by outputting a low output signal in response to receiving a first character of the data sequence signal, the first character comprising a zero, the low output signal having a low amplitude determined according to the control signal, by outputting a high output signal in response to receiving a second character of the data sequence signal, the second character comprising a one, the high output signal having a high amplitude determined according to the control signal, by outputting a high inverse output signal in response to receiving a third character of the data sequence signal, the first character comprising a zero, the high inverse output signal having a high amplitude determined according to the control signal, and by outputting a low inverse output signal in response to receiving a fourth character of the data sequence signal, the second character comprising a one, the low inverse output signal having a low amplitude determined according to the control signal; and
transmitting the equalized data sequence signal, receiving the equalized data sequence signal, determining an error associated with the equalized data sequence signal, and determining a next adjustment of a next data sequence signal in response to the error, the next adjustment operable to equalize the next data sequence signal.

* * * * *